United States Patent [19]
Cummings et al.

[11] Patent Number: 5,955,867
[45] Date of Patent: Sep. 21, 1999

[54] DUAL BATTERY PACK CHARGING IN A COMPUTER SYSTEM

[75] Inventors: John A. Cummings, Round Rock; Barry K. Kates, Austin, both of Tex.

[73] Assignee: Dell USA L.P., Round Rock, Tex.

[21] Appl. No.: 08/902,097

[22] Filed: Jul. 29, 1997

[51] Int. Cl.$^6$ ............................................. H02N 7/00
[52] U.S. Cl. ................................. 320/107; 320/160
[58] Field of Search .......................... 320/107, 119, 320/160

[56] References Cited

U.S. PATENT DOCUMENTS

| | | | |
|---|---|---|---|
| 4,090,122 | 5/1978 | Hoinski | 320/163 |
| 4,156,171 | 5/1979 | Kofink | 320/16 |
| 5,028,859 | 7/1991 | Johnson et al. | 320/124 |
| 5,309,031 | 5/1994 | Stewart et al. | 307/66 |
| 5,311,112 | 5/1994 | Creaco et al. | 320/125 |
| 5,327,067 | 7/1994 | Scholder | 320/2 |
| 5,465,038 | 11/1995 | Register | 320/2 |
| 5,523,671 | 6/1996 | Stewart | 320/39 |
| 5,545,935 | 8/1996 | Stewart | 307/150 |
| 5,717,309 | 2/1998 | Cho | 320/160 |
| 5,764,030 | 6/1998 | Gaza | 320/116 |
| 5,818,200 | 10/1998 | Cummings et al. | 320/116 |

OTHER PUBLICATIONS

U.S. Patent Application entitled "Dual Smart Battery Detection System for Portable Computers", filed May 6, 1997, John Cummings, Jim Leftwich, Serial No. 08/851,781.

*Primary Examiner*—Peter S. Wong
*Assistant Examiner*—Gregory J. Toatley, Jr.
*Attorney, Agent, or Firm*—Skjerven, Morrill, MacPherson, Franklin & Friel, LLP

[57] ABSTRACT

A system for charging dual battery packs. The system includes a charger for supplying current to charge a first battery pack when the first battery pack is electrically coupled to the computer system. The charger supplies current to charge a second battery pack when the second battery pack is electrically coupled to the computer system. The system also includes a charge controller, such as a keyboard controller executing a program stored in a memory, for controlling the charging of the first battery pack and the second battery pack such that the charger charges the first battery pack to a first level, the charger charges the second battery pack to a second level, and the charger simultaneously charges the first battery pack and the second battery pack when the first battery pack is charged above the first level and below a third level and the second battery pack is charged above the second level and below a fourth level. Each battery pack includes a processor, an associated memory, back to back FETs, and lithium ion cells.

37 Claims, 4 Drawing Sheets

DUAL BATTERY PACK CHARGING IN A COMPUTER SYSTEM

BACKGROUND OF THE INVENTION

1. Field of the Invention

This invention relates in general to computer systems, and more specifically charging battery packs that power computer systems.

2. Description of the Related Art

Personal computer systems have attained widespread use. These personal computer systems now provide computing power to many segments of today's modern society. A personal computer system can usually be defined as a desktop, floor-standing, or portable microcomputer that includes a system unit having a system processor or central processing unit (CPU) with associated memory, a display panel, a keyboard, a hard disk storage device or other type of storage media such as a floppy disk drive or a compact disk read only memory (CD ROM) drive. These personal computer systems are information handling systems which are designed primarily to give independent computing power to a single user or group of users and are inexpensively priced for purchase by individuals or small businesses.

A portable computer is a self-contained personal computer designed to be easily moved to and operated in various locations. Portable computers are often referred to as laptop, notebook or subnotebook computers. To be portable, these computers are small, compact, and lightweight. The conventional portable computer comprises a base portion and a lid portion that pivotally opens from the base portion when the portable computer is in use. The lid portion contains a flat panel display such as a liquid crystal display (LCD) or other relatively small display.

Recently, portable computers have become popular alternatives to traditional desktop or floor standing computer systems. Portable computers are typically powered by rechargeable batteries or, in the alternative, by an Alternating Current (AC) adapter electrically connected to an AC outlet. Often it is desirable to operate a portable computer for lengthy periods of time at a location where AC power is unavailable, as for example, on an airplane or outdoors. In such cases, the computer must be powered solely by a battery pack.

Although portable computers are smaller than desktop computers, and despite efforts to decrease the power consumption of portable computers, portable computers still consume a fairly significant amount of power during use. Thus, the amount of time that a battery pack can power a computer is limited. Therefore, the battery pack in the portable computer must be charged every so often.

One solution to maximize the amount of time between rechargings is to provide a portable computer with two battery packs that each can power the portable computer. In such a dual battery system, only one of the battery packs is charged and discharged at any one time. One such dual battery system is described in the U.S. patent titled Dual Smart Battery Detection System for Portable Computers, filed May 6, 1997, U.S. Pat. No. 5,818,200.

When charging a lithium ion battery pack, a charger supplies very little current to charge a battery pack from approximately 80% of full charge to fully charged. Consequently, the amount of time to charge a battery pack from 80% to 100% of full charge takes about as much time as to charge a battery pack from no charge to 80% of full charge.

What is desired is a faster way to charge a dual battery pack system.

SUMMARY OF THE INVENTION

It has been discovered that charging a first battery pack to a first level, charging a second battery pack to a second level, and then simultaneously charging the first battery pack and the second battery pack when the first battery pack is charged above the first level and below a third level and the second battery pack is charged above the second level and below a fourth level advantageously provides a system for decreasing the time needed to charge two battery packs in a computer system.

In one aspect of the present invention, a computer system includes a processor, a memory electrically coupled to the processor, and a charger for supplying current to charge a first battery pack when the first battery pack is electrically coupled to the computer system. The charger supplies current to charge a second battery pack when the second battery pack is electrically coupled to the computer system. The computer system also includes a charge controller for controlling the charging of the first battery pack and the second battery pack such that the charger charges the first battery pack to a first level, the charger charges the second battery pack to a second level, and the charger simultaneously charges the first battery pack and the second battery pack when the first battery pack is charged above the first level and below a third level and the second battery pack is charged above the second level and below a fourth level.

In another aspect of the invention, a method for charging computer system battery packs includes supplying current to a first battery pack from a charger to charge the first battery pack, determining that the first battery pack is charged to a first level, and supplying current to a second battery pack from the charger to charge the second battery pack to a second level. The method also includes determining that the second battery pack is charged to a second level and supplying current simultaneously to the first battery pack and to the second battery pack when the first battery pack is charged above the first and charged below a third level and the second battery pack is charged above the second level and charged below a fourth level.

In another aspect of the invention, a computer system includes a system processor, a memory electrically coupled to the system processor, and a first battery pack capable of powering the computer system including powering the system processor. The computer system further includes a second battery pack capable of powering the computer system including powering the system processor. The computer system also includes a charger supplying current to the first battery pack to charge the first battery pack. The charger supplies current to the second battery pack to charge the second battery pack. The computer system also includes a charge controller for controlling the charging of the first battery pack and the second battery pack such that the charger charges the first battery pack to a first level, the charger charges the second battery pack to a second level, and the charger simultaneously charges the first battery pack and the second battery pack when the first battery pack is charged above the first level and below a third level and the second battery pack is charged above the second level and below a fourth level.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
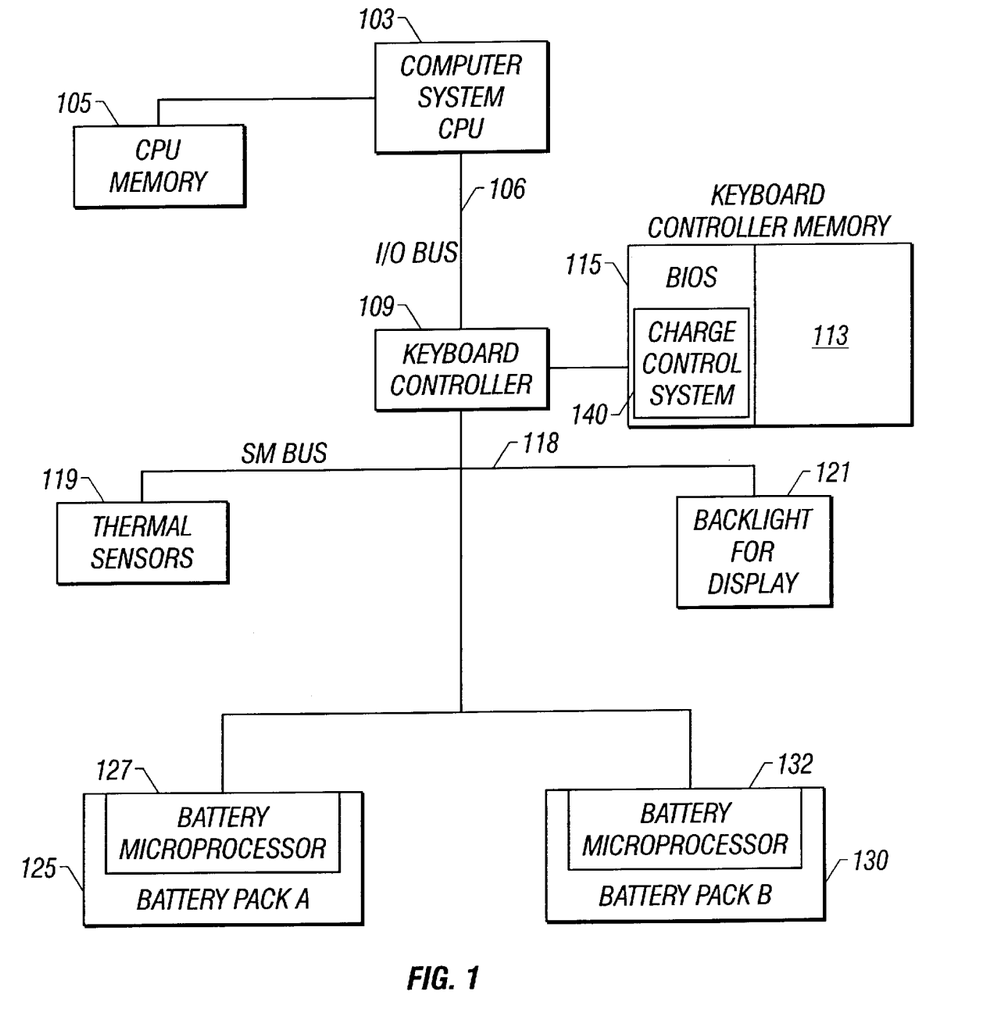
FIG. 1 shows a block diagram of one embodiment of a computer system according to the present invention.

FIG. 1 shows a block diagram of a computer system according to the present invention. The computer system CPU 103 or system processor is electrically coupled to a CPU memory 105, which in the embodiment shown, can either be a RAM or a ROM. The CPU 103 is also electrically coupled to a keyboard controller 109 via an I/O bus 106. The keyboard controller 109 is electrically coupled to a keyboard controller memory 113 which is either a ROM or a RAM. In the embodiment shown, keyboard controller memory 113 includes a Basic Input/Output System (BIOS) 115 which includes a charge control system 140. The keyboard controller is electrically coupled to a system management (SM) bus 118. Electrically coupled to SM bus 118, in the embodiment shown, are the thermal sensors 119, the back light 121 for the LCD display, and two battery pack microprocessors 127 and 132. The keyboard controller 109 receives indication signals from the thermal sensors 119 via the SM bus 118. The keyboard controller 109 controls the back light 121 for the display via signals sent on the SM bus 118. One type of keyboard controller that may be used with the present invention is available under the trade designation 8051 from SMC or other manufacturers.

Figure 2:
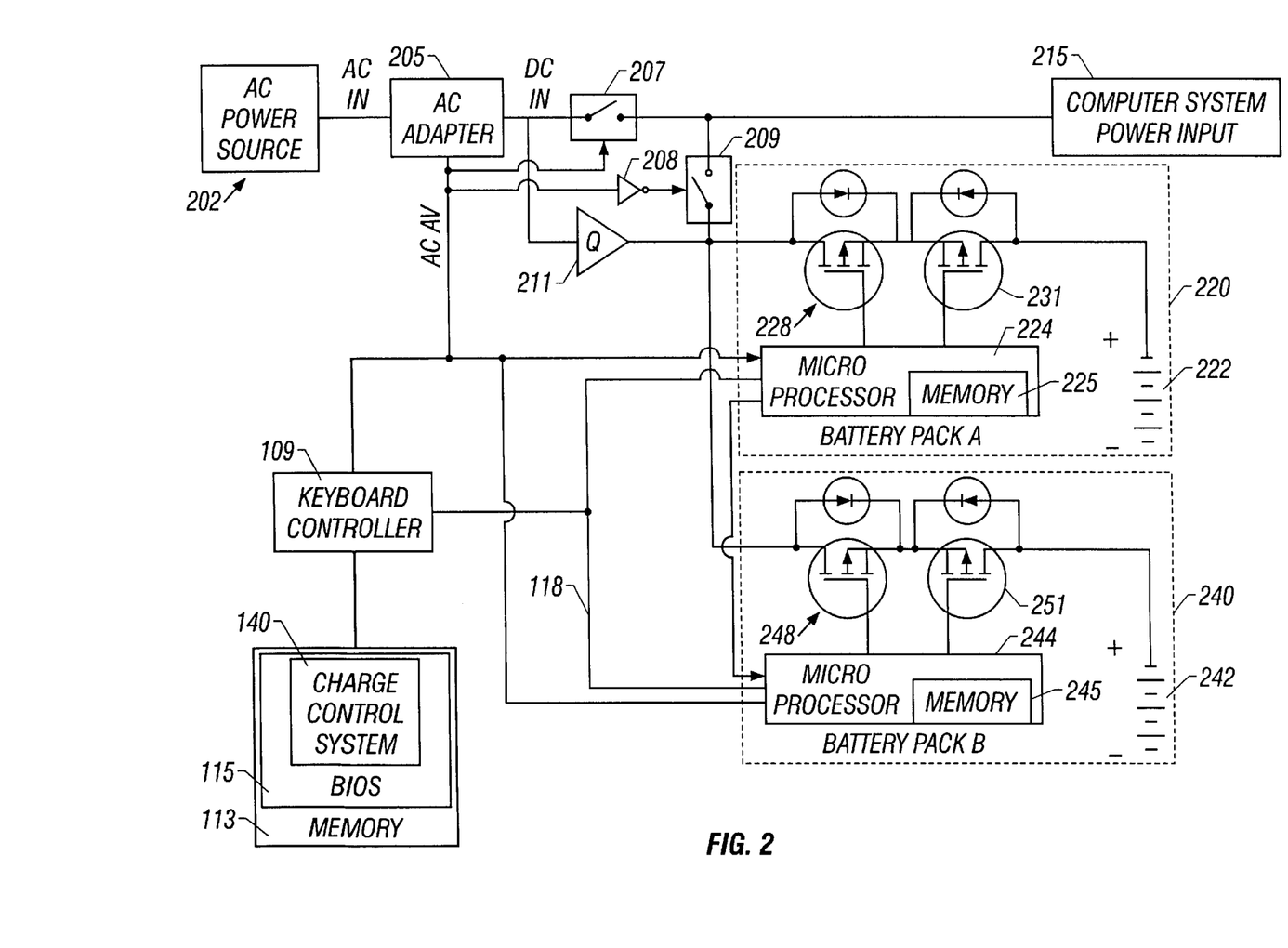
FIG. 2 shows a schematic diagram of one embodiment of a computer system according to the present invention.

FIG. 2 shows a schematic diagram of one embodiment of a computer system according to the present invention. In the embodiment shown, the computer system is powered via direct current supplied to the computer system power input 215. This direct current may be supplied via switch 207 from an AC adapter 205, which converts alternating current from an AC power source 202, such as a 120 volt receptacle, to direct current (DC). The computer system can also be powered by either battery pack A 220 or battery pack B 240. When powered by battery pack A or B, direct current is supplied to the computer power system input 215 via switch 209.

The computer system shown in FIG. 2 also includes a charger 211 that receives direct current from the AC adapter and supplies direct current at its output to the battery packs 220 and 240 in order to charge the battery packs. In the embodiment shown, each battery pack 220 and 240 includes back-to-back Field Effect Transistors referred to as "back-to-back FETs" for receiving the charging current from the charger 211 and for supplying current to power the computer system. The back-to-back FETs in battery pack A are FETs 228 and 231. The back-to-back FETs in battery pack B are FETs 248 and 251. In the embodiment shown, FETs 228, 231, 248, and 251 are P-type transistors. In the embodiment shown, the back-to-back FETs of each battery pack have their sources tied together with the drains of FETs 228 and 248 tied to the charger 211 output and the drains of the other FETs 231 and 251 tied to the cells 222 and 242, respectively.

Battery pack A includes one or more lithium ion cells 222 and battery pack B includes one or more lithium ion cells 242. In other embodiments, cells 222 and 242 can be other types of cells such as nickel cadmium cells or nickel metal hydride cells.

In the embodiment shown, FET 231 controls the flow or current from the charger 211 to the cells 222. Thus, when FET 231 is conductive, the charger 211 supplies current to the cells 222 to charge cells 222. FET 228 controls the flow of current from the cells 222 to switch 209. Thus, when FET 228 is conductive, cells 222 can supply current to the computer system power input 215 to power the computer system, depending on whether switch 209 is conductive. FETs 248 and 251 operate in a similar manner with respect to battery pack B 240. Although the embodiment shown uses FETs 228, 231, 248, and 251 to control the current to and from the cells 222 and 242, other types of switches may be used.

In the embodiment shown, battery pack A 220 and battery pack B 240 are smart battery packs that include microprocessors 224 and 244, respectively. Each of the microprocessors 224 and 244 has an associated memory 225 and 245, respectively, electrically coupled to the respective microprocessor. Battery pack A 220 includes cells 222, and battery pack B 242 includes cells 242. In the embodiment shown, cells 222 and 242 each include one or more of lithium ion cells. Lithium ion cells can be easily damaged by improper charging. Therefore, cells 222 and 242 must be charged and discharged in accordance with voltage and current specifications in order to prevent permanent damage to the cells. Microprocessors 224 and 244 monitor the performance of the cells 222 and 242 respectively, including monitoring the charge level of the cells, and regulate the charging and discharging of the cells 222 and 242 to achieve maximum performance and to prevent damage to the cells. Microprocessors 224 and 244 control the charging and discharging of cells 222 and 242, respectively, by controlling the conductivity of the back-to-back FETs 228, 231, 248 and 251, respectively, of each battery pack 220 and 240, respectively. In the embodiment shown, microprocessor 224 has an output electrically connected to the gate of FET 228 and another output electrically connected to the gate of FET 231 to independently control the conductivity of FETs 228 and 231. Battery pack B 240 is of a similar arrangement.

In the embodiment shown, keyboard controller 109 communicates via electronic signals over the SM bus 118 with the microprocessors 224 and 244. In the embodiment shown, keyboard controller 109 is electrically coupled to a memory 113 which includes a BIOS 115. The keyboard controller 109 controls the charging and the discharging of the battery packs A and B according to the charge control system 140. To control the charging and the discharging of the battery packs, the keyboard controller 109 directs the microprocessors 224 and 244 of each of the battery packs 220 and 240, respectively, to make conductive and non conductive the individual FETs 228, 231, 248, and 251. The keyboard controller 109 directs the microprocessors 224 and 244 by sending or providing controls signals on SM bus 118 to the microprocessors 224 and 244. In one embodiment, these control signals change the execution states of the microprocessors 224 and 244. The keyboard controller 109 monitors the charge levels of the cells 222 and 242 via the microprocessors 224 and 244, respectively, and the SM bus 118. In some embodiments, the keyboard controller 109 reads the charge levels of the cells 222 and 242 from the microprocessors 224 and 244, respectively. In other embodiments, the microprocessors 224 and 244 transmits signals indicating the charge levels to the keyboard controller 109.

The computer system shown in FIG. 2 also includes switches 207 and 209 which control the flow of current into the computer system power input 215. In the embodiment shown, AC adapter 205 provides an AC available signal (ACAV) that indicates that the AC adapter is receiving current from an AC power source 202. This ACAV signal is used to control switches 207 and 209. The ACAV signal is also received by microprocessor 224 and 244 and the keyboard controller 109. In the embodiment shown, when the AC adapter 205 receives power from the AC power source 202, the ACAV is high. Although in other embodiments, the ACAV signal maybe active low. When the ACAV signal is high, switch 207 is closed and switch 209 is open via inverter 208. In the embodiment shown, switches 207 and 209 are back-to-back FETs with the gates of switch 207 tied together to the ACAV signal and the gates of switch 209 tied together to the inverted ACAV signal.

Figure 3:
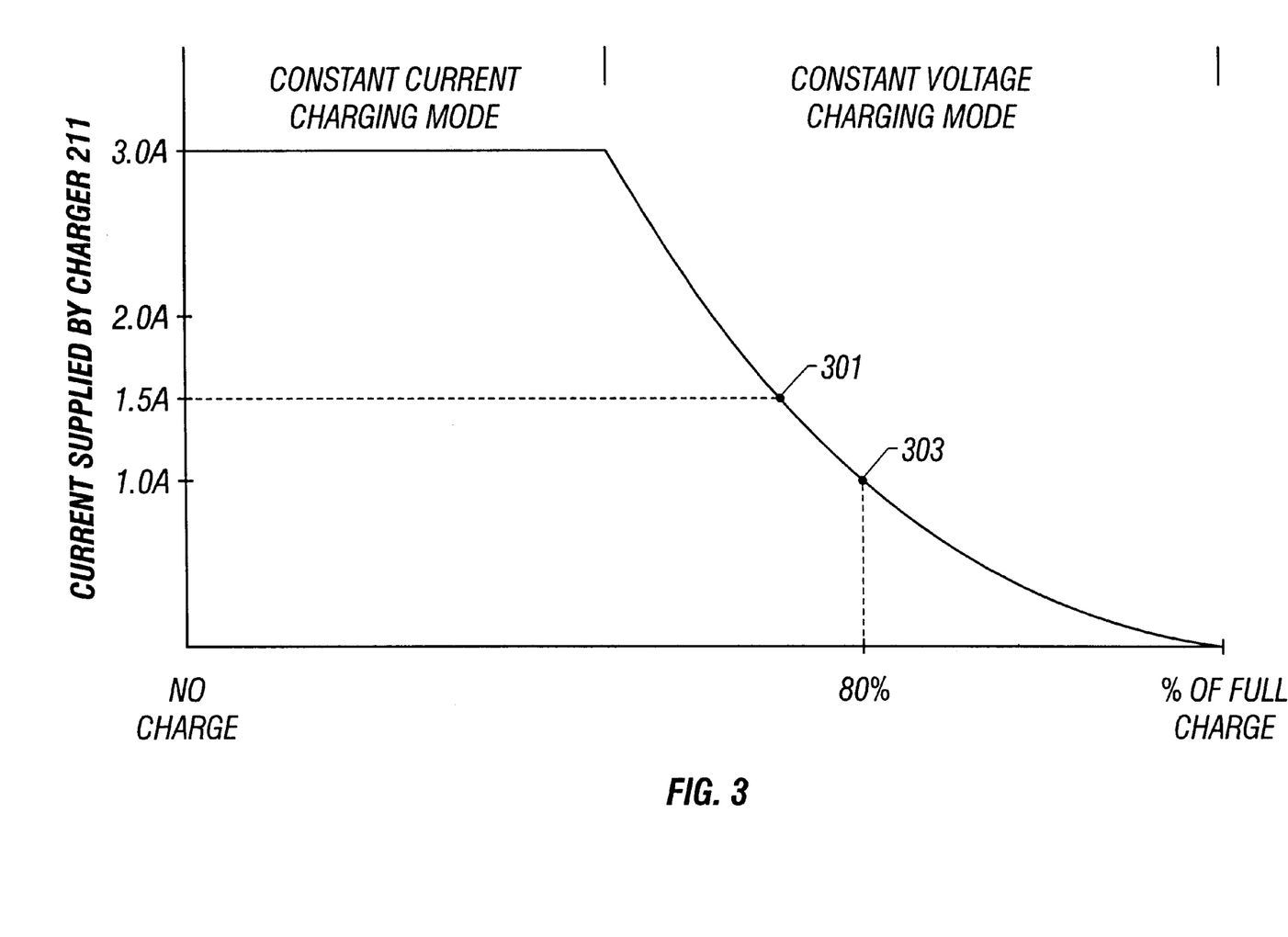
FIG. 3 shows a graph of one example of the charging current provided by a charger to charge a battery pack.

FIG. 3 shows a graph of one example of the charging current provided by a battery charger to charge a battery pack versus the percentage of full charge of the battery pack. In the embodiment shown, charger 211 supplies current to the battery packs A 220 and B 240 to charge the lithium ion cells 222 and 242, respectively. In one embodiment, charger 211 is a constant current constant voltage (CCCV) type of charger that has two charging modes in charging a battery pack. In the first mode, the constant current charging mode, the battery charger 211 supplies current to a battery pack at a constant current level, which in the embodiment shown, is approximately three amps. Once the battery pack being charged reaches a specific level of charge, the battery charger goes into a second mode, the constant voltage charging mode. In this second mode, the voltage of the charger's output is constant with the amount of current supplied to the battery pack decreasing in proportion to the percentage of full charge of the battery pack. At the beginning of the constant voltage charging mode in the embodiment shown, the charger supplies approximately three amps of charging current to the battery pack. By the time the battery pack is approximately fully charged, the charger is supplying a nominal amount of current to the battery pack. Because the amount of current supplied to the battery pack decreases as the battery pack becomes more charged, the time needed to charge the battery pack from a no charge level to the point where the battery charger enters the constant voltage charging mode, is significantly less than the time from when the charger enters a constant voltage mode to when the battery pack is fully charged. In the embodiment shown, it may take 45 minutes for a battery pack to reach 80% of full charge from a no charge level. However, to charge a battery pack from 80% of full charge to nearly fully charged may take 45 minutes to an hour. Consequently, to fully charge two battery packs, from a no charge level to fully charged level may take approximately three hours and thirty minutes.

With the present invention, charger 211 charges the first battery to a first level of charge, such as 80% of fully charged, and then it charges the second battery pack to a second charge level, such as 80% of full charge. Afterwards, it charges both battery packs simultaneously until one of the battery packs becomes fully charged. At which time the charger stops charging the battery pack that has reached fully charged. The charger then continues to charge the other battery pack until it is fully charged.

In the embodiment shown, charger 211 begins supplying current to battery pack A at approximately 3 amps to charge battery pack A from a no charge level to a first charge level of approximately 80% of full charge. During the charging to 80% of full charge, charger 211 will move from the constant current charging mode to the constant voltage charging mode. In the constant voltage charging mode, the current from charger 211 decreases as the charge level of battery pack A increases. When battery pack A is at 80% of full charge, the current supplied by the charger 211 (location 303 of the graph in FIG. 3) is less than one-half (approximately 1.5 A) of the current supplied by the charger 211 in the constant current charging mode. At point 303, charger 211 is able to supply at least 1.5 A of current to charge battery pack B while simultaneously charging battery pack A from a first charge level of full charged to fully charged. In the embodiment shown, the level of charge of a battery pack at which the charger 211 supplies current at half the rate as in the constant charge mode (1.5 Amps at location 301) is when a battery pack is less than 80% of fully charged. However, in other embodiments, the charge level of when the charger is supplying half of the charging current may range from approximately 60% to approximately 90% of fully charged depending on the charger type, the cell type and the arrangement of the battery packs.

Figure 4:
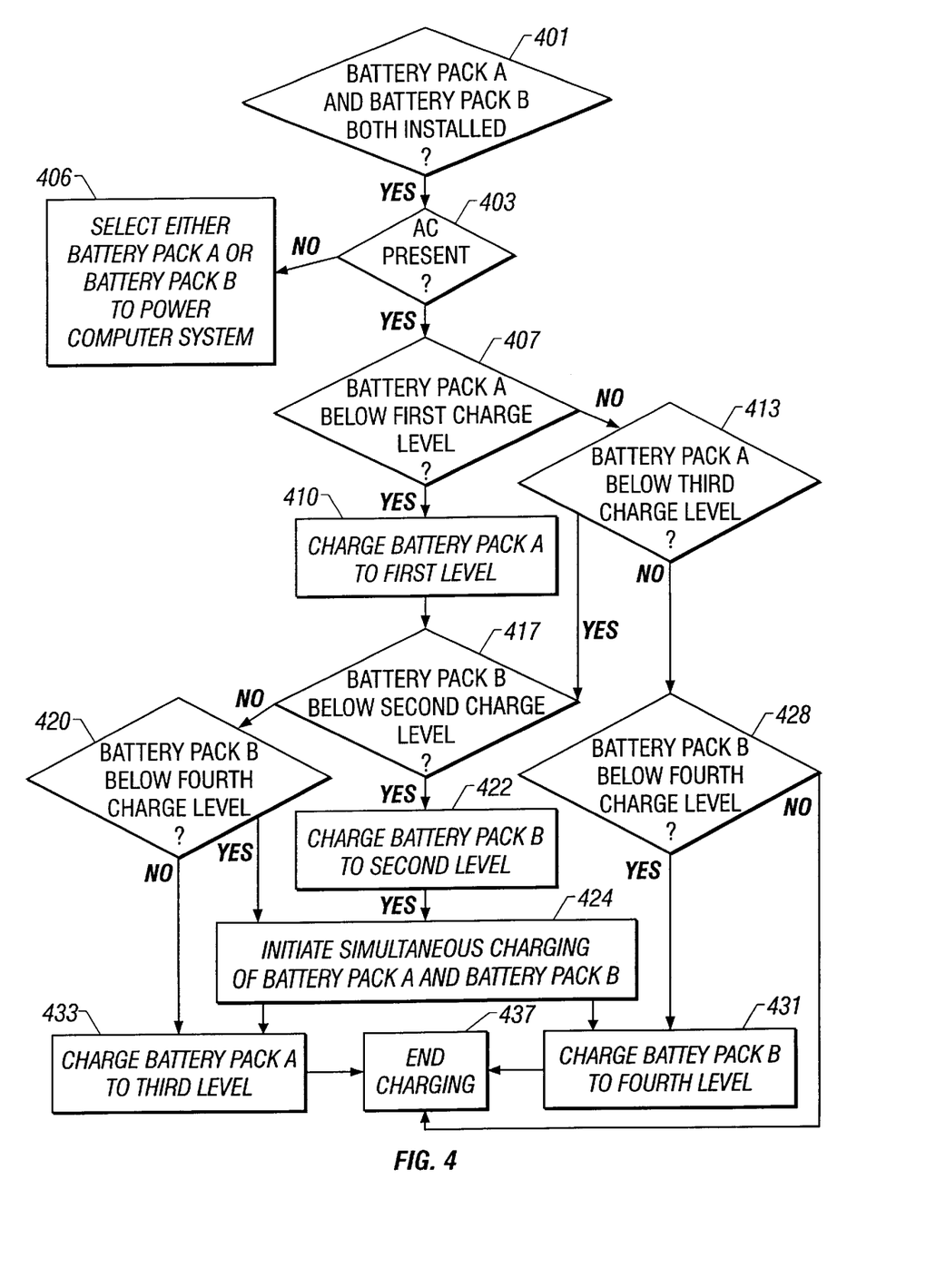
FIG. 4 shows a flow chart of one embodiment of the present invention.

FIG. 4 shows a flow diagram for the operation of the charge control system 140. Referring back to FIG. 2, this flow diagram, in the embodiment shown, is implemented by the keyboard controller 109 executing the charge control system 140 stored in the BIOS memory 115 to provide a charge controller. In Step 401, the charge controller, detects whether both battery pack A and battery pack B are installed. In the embodiment shown in FIG. 2, Step 403 is accomplished by keyboard controller 109 receiving an indication signal via the SM bus 118 from the battery pack A microprocessor 224 and the battery pack B microprocessor 244 indicating that the battery packs are installed in the computer system.

If both battery packs are installed, the charge controller next determines whether the AC adapter is present in Step 403. In the embodiment shown in FIG. 2, Step 403 is accomplished by the keyboard controller 109 receiving a high ACAV signal from the AC adapter 205. In alternative embodiments, Step 403 may also be accomplished by the keyboard controller 109 receiving an indication signal from the microprocessors 224 and 244 via the SM bus 118 indicating that the ACAV signal is high. If the AC adapter 205 is not present, the charge controller then selects either battery pack A or battery pack B to power the computer system in Step 406. In the embodiment of FIG. 2, Step 406 is accomplished by the keyboard controller 109 directing either microprocessor 224 to make conductive switch 228 or microprocessor 244 to make conductive switch 248, depending on which battery pack is directed to power the computer system.

When the AC adapter is present as determined in Step 403, the controller determines whether battery pack A is below a first charge level in Step 407. In the embodiment shown in FIG. 2, Step 407 is accomplished by keyboard controller 109 monitoring the charge level of the cells 222 in battery pack a via microprocessor 224. In the embodiment shown, the first charge level is approximately 80%. If the first battery pack is charged below the first charge level, then the charger charges the first battery pack to a first charge level in Step 410. In the embodiment shown in FIG. 2, Step 410 is accomplished by the keyboard controller 109 directing the microprocessor 224 via the SM bus 118 to make conducting FET 231 so that charging current from charger 211 can flow to cells 222. When the microcontroller 109 has determined via microprocessor 224 that the cells 222 are charged at the first charge level, microcontroller 109 directs microprocessor 224 to make non conductive FET 231 to cease charging battery pack A. Also during Step 410 in the embodiment shown, the microprocessor 224 simultaneously makes conductive FET 228, as well. The purpose of having FET 228 conductive during the charging of battery pack A to the first charge level, is to lower the impedance of the charging path to cells 222. Having FET 228 conductive during the charging of battery pack A to the first charge level also enables battery pack A to immediately power the computer system via the computer system power input 215 if the AC power source 202 is suddenly removed.

In some embodiments, the keyboard controller 109 directs the microprocessor 224 to make conductive FETs 228 and 231 by placing microprocessor 224 in a single charging execution state in which microprocessor 224 makes conductive FETs 228 and 231. In some embodiments, microprocessor 224 would stay in the single charging execution state until keyboard controller 109 directs the microprocessor 224 to exit the state when the keyboard controller 109 determines via the status signals that the charge level of battery pack A is approximately 80% of fully charged. In other embodiments, the microprocessor 224 exits the single charging execution state when the microprocessor 224 determines that the charge level of cells 222 is approximately 80% of fully charged.

If in Step 407 battery pack A is determined to be charged above the first charge level, then in Step 413, the charge controller determines whether battery pack A is charged below a third charge level, or is below approximately fully charged. In the embodiment shown in FIG. 2, Step 413 is accomplished by the keyboard controller 109 monitoring the charge level of battery pack A via microprocessor 224 and the SM bus 118. If it is determined that the battery pack A is charged to the third level or is fully charged, then the charge controller must determine whether battery pack B is less than fully charged or is charged below the fourth charge level in Step 428. In the embodiment shown in FIG. 2, Step 428 is accomplished by the keyboard controller 109 monitoring the charge level of cells 242 via microprocessor 244. If battery pack B is not fully charged or not charged to the fourth charge level, then charger 211 charges battery pack B to the fourth charge level or to fully charged.

Referring back to Step 413, if it is determined that battery pack A is below the third charge level or below fully charged, the program proceeds to Step 417 just as if the charger had charged battery pack A to the first charge level as in Step 410. In Step 417, the charge controller must determine whether battery pack B is charged below a second charge level or in the embodiment shown, is charged below 80% of full charge. Step 417 is accomplished, in the embodiment shown in FIG. 2, by the keyboard controller 109 monitoring the charge level of cells 242 via microprocessors 244 and SM bus 118.

If it is determined that the charge level of battery pack B is charged below the second charge level, then battery pack B is charged to the second charge level in Step 422. Step 422 is accomplished, in the embodiment shown in FIG. 2, by the controller 109 directing microprocessor 244 via the SM bus 118 to make conductive FET 251 so that charger 211 can supply current to cells 242. Step 422 is completed when the microcontroller 109 has determined that the cells 222 are charged at the second charge level. In the embodiment shown in FIG. 2, FET 248 is also made conductive during the charging of cells 222.

In some embodiments, the keyboard controller 109 directs the microprocessor 244 to make conductive FETs 248 and 251 by placing microprocessor 244 in a single charging execution state in which microprocessor 244 makes conductive FETs 248 and 251. In some embodiments, microprocessor 244 would stay in the single charging execution state until keyboard controller 109 directs the microprocessor to exit the state when the keyboard controller determines via microprocessor 244 that the charge level of battery pack B is approximately 80% of fully charged. In other embodiments, the microprocessor 244 exits the single charging execution state when the microprocessor 244 determines that the charge level of cells 242 is approximately 80% of fully charged.

If in Step 417, it is determined that battery pack B is charged above the second charge level, the charge controller in Step 420 then determines whether battery pack B is charged below a fourth charge level or below fully charged. In the embodiment shown in FIG. 2, Step 420 is accomplished by the keyboard controller 109 monitoring via microprocessor 244 and the SM bus 118 the charge level of battery pack B. If battery pack B is fully charged or charged at the fourth charge level as determined in Step 420, then battery pack A is charged to the third level or is fully charged in Step 433. In the embodiment shown, Step 433 is accomplished by keyboard controller 109 directing microprocessor 224 to make conducting FET 231 and also to make conducting switch 228.

If battery pack B is determined to be charged below the fourth charge level or below fully charged in Step 420, then the charge controller initiates the simultaneous charging of battery pack A and battery pack B in Step 424. Simultaneous charging is also initiated after the completion of Step 422. Simultaneous charging of battery pack A and battery pack B continues until one of the battery packs is determined to be fully charged. At which time, the fully charged battery pack ceases to be charged and the other battery pack continues to be charged until it is fully charged, as well. To accomplish Step 424 in the embodiment shown in FIG. 2, the keyboard controller 109 directs microprocessor 224 to make conductive FET 231 and directs microprocessor 244 to make conductive FET 251 which enables the charger 211 to simultaneously supply charging current to both cells 222 and 242. Also, during the simultaneous charging of battery packs A and B, FETs 228 an 248 are non conductive.

When either battery pack A or battery pack B reaches the fully charged level, that battery pack microprocessor no longer accepts charging current from charger 211 by making non conductive the incoming FET to the fully charged battery pack in order to prevent over charging of the fully charged cells. Thus, during simultaneously charging, microprocessors 224 and 244 automatically make non-conductive their respective incoming FETs either 231 or 251 when that battery pack has reached the fully charged level. However, in other embodiments, FETs 231 or 251 are not made non-conductive until the keyboard controller 109 determines that its respective cells, 222 or 242 have reached the third or fourth charge levels, respectively, or are fully charged. The keyboard controller 109 then directs the microprocessor of the fully charged battery pack to make non-conductive its respective incoming FET.

In some embodiments, the keyboard controller 109 directs microprocessors 224 and 244 to make conductive the incoming FETs 231 and 251, respectively, and make non conductive FETs 228 and 248, respectively, by placing the microprocessors 224 and 244 in a dual charge execution state. In this dual charge execution state, a battery pack microprocessor makes conductive its incoming FET (231 or 251) and makes non conductive its other FET (228 or 248). When a battery pack processor has determined that its individual cells have become fully charged, the processor makes non conductive its incoming FET.

When both battery packs are fully charged, the charge controller transitions to an end charge state 437.

Table 1 shows the state of the FETs 228, 231, 248, and 251 during various powering conditions of the computer system. When battery pack A is being charged by charger 211 to the first charge level as in Step 410, FETs 228 and 231 are both conductive and FETs 248 and 251 are non-conductive. When battery pack B is being charged to the second charge level as in Step 422, FETs 228 and 231 are non-conductive and FETs 248 and 251 are both conductive. When powering the computer system from battery pack A, FETs 228 and 231 are both conductive and FETs 248 and 251 are non-conductive. When powering the computer system from battery pack B, FETs 228 and 231 are non-conductive and FETs 248 and 251 are conductive. When simultaneously charging battery pack A and battery pack B, FETs 231 and 251 are conductive and FETs 228 and 248 are non-conductive. The reason that FETs 228 and 248 are non-conductive during the simultaneous charging of battery packs A and B is to prevent current from either battery pack A or B from flowing into the other battery pack if the cells are at different voltage potentials.

removal of AC power from the low ACAV signal, chooses one of the battery packs (A or B) to supply power to the computer system power input 215. This is accomplished by directing the microprocessor of the battery pack not chosen to make non-conductive the outgoing FET (either 228 or 248). In the embodiment shown, keyboard controller 109 also directs the microprocessor of the battery pack chosen to power the computer system to make conductive its incoming FET (either 231 or 251). In some embodiments, the keyboard controller directs the Microprocessor of the chosen battery pack to enter into a supply power execution state in order to make conductive the incoming FET and directs the microprocessor of the battery pack not chosen to enter into a non power supply execution state in order to make non conductive the outgoing FET.

In the embodiment of FIG. 2, microcontroller 109 may select which battery pack (220 or 240) to power the computer system based upon which battery pack has the higher charge level.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

TABLE 1

| COMPUTER SYSTEM POWERING CONDITION | TRANSISTOR 228 | TRANSISTOR 231 | TRANSISTOR 248 | TRANSISTOR 251 |
|---|---|---|---|---|
| Charging Pack A to the first level of charge | Conductive | Conductive | Non Conductive | Non Conductive |
| Charging Pack B to the second level of charge | Non Conductive | Non Conductive | Conductive | Conductive |
| Powering the Computer System from Pack A | Conductive | Conductive | Non Conductive | Non Conductive |
| Powering the Computer System from Pack B | Non Conductive | Non Conductive | Conductive | Conductive |
| Simultaneously charging Pack A and Pack B | Non Conductive | Conductive | Non Conductive | Conductive |
| Removing the AC while Simultaneously Charging | Conductive | Non Conductive | Conductive | Non Conductive |

In the embodiment shown in FIG. 2, having both FETs 228 and 248 non conductive during the simultaneous charging of both battery packs can create a problem under certain conditions. If the AC power source is disconnected during simultaneous charging, the computer system can not immediately be powered by either of the battery packs A and B. This is because FETs 228 and 248 control the flow of current from the battery packs to the computer system power input 215 when switch 209 is closed.

To compensate for this problem in the embodiment shown in FIG. 2, if AC power is removed during the simultaneously charging of battery packs A and B, the battery pack microprocessors 224 and 244 are programmed to immediately make conductive FETs 228 and 248, respectively, upon the ACAV signal going low. The ACAV signal going low indicates that the AC power source 202 has been disconnected from the computer system and that the AC adapter 205 is no longer supplying direct current to the computer system power input 215. Also, if AC power is removed during simultaneous charging of the battery packs, the battery pack microprocessors 224 and 244 immediately make non-conductive FETs 231 and 251 to prevent the batteries from supplying current to each other. For instance, making non-conductive FET 231 prevents cells 242 from supplying current to cells 222, and conversely, making switch 251 non-conductive prevents cells 222 from supplying current to cells 242. Once both battery pack microprocessors 224 and 244 have made conductive FETs 228 and 248, respectively, and made non-conductive FETs 231 and 251, respectively, the keyboard controller 109, sensing the

What is claimed is:

1. A computer system comprising:

a processor;

a memory electrically coupled to the processor;

a charger for supplying current to charge a first battery pack when the first battery pack is electrically coupled to the computer system, the charger for supplying current to charge a second battery pack when the second battery pack is electrically coupled to the computer system;

a charge controller for controlling the charging of the first battery pack and the second battery pack such that the charger charges the first battery pack to a first level, the charger charges the second battery pack to a second level, and the charger simultaneously charges the first battery pack and the second battery pack when the first battery pack is charged above the first level and below a third level and the second battery pack is charged above the second level and below a fourth level;

wherein the charger supplies current to the first battery pack via a first switch to charge the first battery pack, the charge controller making conductive the first switch to charge the first battery pack;

wherein the charger supplies current to the second battery pack via a second switch to charge the second battery pack the charge controller making conductive the second switch to charge the second battery pack;

wherein the charge controller makes a third switch and a fourth switch non conductive when the charger is simultaneously charging the first battery pack and the second battery pack, the computer system capable of being powered by current supplied via the third switch from the first batter pack, the computer system capable of being powered by current supplied via the fourth switch from the second battery pack.

2. The computer system of claim 1 wherein:

the first and second levels are of a range of approximately 60 percent to 90 percent of a full charge.

3. The computer system of claim 1 wherein the third and fourth levels are approximately fully charged.

4. The computer system of claim 1 wherein:

the conductivity of the first switch is controlled by a first battery processor included with the first battery pack;

the charge controller makes conductive the first switch by directing the first battery processor to make conductive the first switch;

the conductivity of the second switch is controlled by a second battery processor included with the second battery pack; and the charge controller makes conductive the second switch by directing the second battery processor to make conductive the second switch.

5. The computer system of claim 1 wherein:

when the computer system is being powered from an alternating current source and when the charger is simultaneously charging the first battery pack and the second battery pack, in response to the computer system ceasing to be powered from the alternating current source, the first switch and the second switch become non conducting and the third switch and the fourth switch become conductive to power the computer system from the first battery pack and the second battery pack, after the third switch and the fourth switch becoming conductive, the charge controller making one of the third switch or the fourth switch non conductive to cease powering the computer system from one of the first battery pack or the second battery pack, respectively.

6. A computer system comprising:

a processor;

a memory electrically coupled to the processor;

a charger for supplying current to charge a first battery pack when the first battery pack is electrically coupled to the computer system, the charger for supplying current to charge a second battery pack when the second battery pack is electrically coupled to the computer system;

a charge controller for controlling the charging of the first battery pack and the second battery pack such that the charger charges the first batter pack to a first level, the charger charges the second battery pack to a second level, and the charger simultaneously charges the first battery pack and the second battery pack when the first battery pack is charged above the first level and below a third level and the second battery pack is charged above the second level and below a fourth level;

wherein the charge controller includes:

a second memory; and a second processor electrically coupled to the second memory, the second processor controlling the charging of the first battery pack and the second battery pack according to a program stored in the second memory, the processor monitoring the charge level of the first battery pack, the second processor monitoring the charge level of the second battery pack.

7. The computer system of claim 6 wherein the second memory includes a Basic Input/Output System (BIOS).

8. The computer system of claim 6 wherein the second processor includes a keyboard controller.

9. The computer system of claim 6 wherein:

the second processor directs a first battery processor included with the first battery pack to control the charging of the first battery pack;

the second processor directs a second battery processor included with the second battery pack to control the charging of the second battery pack.

10. The computer system of claim 6 wherein:

the first and second levels are of a range of approximately 60 percent to 90 percent of a full charge.

11. The computer system of claim 6 wherein the third and fourth levels are approximately fully charged.

12. The computer system of claim 6 wherein:

the charger supplies current to the first battery pack via a first switch to charge the first battery pack, the charge controller making conductive the first switch to charge the first battery pack; and the charger supplies current to the second battery pack via a second switch to charge the second battery pack, the charge controller making conductive the second switch to charge the second battery pack.

13. The computer system of claim 12 wherein:

the conductivity of the first switch is controlled by a first battery processor included with the first battery pack;

the charge controller makes conductive the first switch by directing the first battery processor to make conductive the first switch;

the conductivity of the second switch is controlled by a second battery processor included with the second battery pack; and the charge controller makes conductive the second switch by directing the second battery processor to make conductive the second switch.

14. A method for charging battery packs comprising:

supplying current to a first battery pack from a charger to charge the first battery pack;

determining that the first battery pack is charged to a first level;

supplying current to a second battery pack from the charger to charge the second battery pack to a second level; and determining that the second battery pack is charged to a second level;

supplying current simultaneously to the first battery pack and to the second battery pack when the first battery pack is charged above the first and charged below a third level and the second battery pack is charged above the second level and charged below a fourth level;

wherein the supplying of current to the first battery pack includes making conductive a first switch, the current to the first battery pack being supplied via the first switch;

wherein the supplying of current to the second battery pack includes making conductive a second switch, the current to the second battery pack being supplied via the second switch;

wherein the supplying of current simultaneously to the first and the second battery packs includes making conductive the first and second switches;

wherein the first battery pack supplies current to a power input of a computer system to power the computer system via a third switch; and wherein the second battery pack supplies current to the power input to power a computer system via a fourth switch.

15. The method of claim 14 wherein:

the supplying of current to the first battery pack includes making conductive the third switch; and the supplying of current to a second battery pack includes making conductive the fourth switch.

16. The method of claim 14 wherein:

the supplying of current simultaneously to the first battery pack and the second battery pack includes making the third and fourth switches non conductive.

17. The method of claim 16 further comprising:

supplying current from an alternating current adapter to the power input of the computer system;

removing the supply of current from the alternating current adapter to the power input of the computer system during the supplying of current simultaneously to the first battery pack and to the second battery pack; and in response to the removing of the supply of current, making conductive the third and fourth switches and making non conductive the first and the second switches.

18. The method of claim 14 further comprising:

making the first switch non conductive when the first battery pack is determined to be charged to the first level;

determining that the first battery pack is charged to a third level;

making the first switch non conductive when the first battery pack is determined to be charged to the third level; and determining that the second battery pack is charged to a fourth level; and making the second switch non conductive when the second battery pack is determined to be charged to the fourth level.

19. The method of claim 14 wherein:

the supplying of current to the first battery pack includes supplying current at a first level;

the supplying current simultaneously to the first battery pack and to the second battery pack includes supplying current to the first battery pack at a second level; and the second level is less than half of the first level.

20. A computer system comprising:

a system processor;

a memory electrically coupled to the system processor;

a first battery pack capable of powering the computer system including powering the system processor;

a second battery pack capable of powering the computer system including powering the system processor;

a charger supplying current to the first battery pack to charge the first battery pack, the charger supplying current to the second battery pack to charge the second battery pack; and a charge controller for controlling the charging of the first battery pack and the second battery pack such that the charger charges the first battery pack to a first level, the charger charges the second battery pack to a second level, and the charger simultaneously charges the first battery pack and the second battery pack when the first battery pack is charged above the first level and below a third level and the second battery pack is charged above the second level and below a fourth level;

wherein the charge controller includes:

a second memory; and a second processor electrically coupled to the second memory, the second processor controlling the charging of the first battery pack and the second battery pack according to a program stored in the second memory, the second processor monitoring the charge level of the first battery pack, the second processor monitoring the charge level of the second battery pack.

21. The computer system of claim 20 further comprising:

a first switch, the charger supplying current to the first battery pack via the first switch to charge the first battery pack, the charge controller making the first switch conductive to charge the first battery pack; and a second switch, the charger supplying current to the second battery pack via the second switch to charge the second battery pack, the charge controller making the second switch conductive to charge the second battery pack.

22. The computer system of claim 20 wherein the second memory includes a Basic Input/Output System (BIOS).

23. The computer system of claim 20 wherein the second processor includes a keyboard controller.

24. A computer system comprising:

a system processor;

a memory electrically coupled to the system processor;

a first battery pack capable of powering the computer system including powering the system processor;

a second battery pack capable of powering the computer system including powering the system processor;

a charger supplying current to the first battery pack to charge the first battery pack, the charger supplying current to the second battery pack to charge the second battery pack;

a charge controller for controlling the charging of the first battery sack and the second battery pack such that the charger charges the first battery pack to a first level, the charger charges the second battery pack to a second level, and the charger simultaneously charges the first batter pack and the second battery pack when the first battery pack is charged above the first level and below a third level and the second battery pack is charged above the second level and below a fourth level;

a first switch, the charger supplying current to the first battery pack via the first switch to charge the first battery pack, the charge controller making the first switch conductive to charge the first battery pack;

a second switch, the charger supplying current to the second battery pack via the second switch to charge the second battery pack the charge controller making the second switch conductive to charge the second battery pack;

a power input for receiving direct current for powering the computer system including powering the system processor;

a third switch, the first battery pack supplying current to the power input to power the computer system via the third switch; and a fourth switch, the second battery pack supplying current to the power input to power the computer system via the fourth switch.

25. The computer system of claim 24 wherein:

the third switch is conductive when the charger is charging the first battery pack to the first level;

the fourth switch is conductive when the charger is charging the second battery pack to the second level.

26. The computer system of claim 24 wherein:

the first switch and the third switch are back-to-back FETs; and the second switch and the fourth switch are back-to-back FETs.

27. The computer system of claim 24 wherein:

the first battery pack includes the first switch and the third switch; and the second battery pack includes the second switch and the fourth switch.

28. The computer system of claim 24 wherein wherein the third switch and the fourth switch are non conductive when the charger is simultaneously charging the first battery pack and the second battery pack.

29. The computer system of claim 28 further comprising:

an AC adapter electrically coupled to the power input, the AC adapter supplying direct current to the power input to power the computer system including powering the system processor; and wherein when the charger is simultaneously charging the first battery pack and the second battery pack and when the power input ceases to receive direct current from the AC adapter to power the computer system, the third switch and the fourth switch become conductive and the first switch and second switch become non conductive.

30. The computer system of claim 29 wherein:

after the third switch and the fourth switch become conductive and the first switch and the second switch become non conductive, the charge controller makes one of the third switch or the fourth switch non conductive to cease powering the computer system from one of the first battery packs or the second battery packs respectively.

31. The computer system of claim 29 wherein:

the first battery pack includes a first battery processor;

the second battery pack includes a second battery processor;

the first and second battery processors each receives an AC available signal indicating whether the AC adapter is supplying direct current to the power input; and when the charger is simultaneously charging the first battery pack and the second battery pack, in response to receiving an indication via the AC available signal that the AC adapter is no longer supplying current to the power input, the first battery processor makes non conductive the first switch and makes conductive the third switch and the second battery processor makes non conductive the second switch and makes conductive the fourth switch.

32. The computer system of claim 21 further wherein:

the first battery pack includes a first battery processor, the first battery processor controlling the conductivity of the first switch;

the second battery pack includes a second battery processor, the second battery processor controlling the conductivity of the second switch;

the charge controller makes conductive the first switch by directing the first battery processor to make conductive the first switch; and the charge controller makes conductive the second switch by directing the second battery processor to make conductive the second switch.

33. The computer system of claim 20 wherein:

the first and second levels are of a range of approximately 60 percent to 90 percent of fully charged.

34. The computer system of claim 20 wherein the third and fourth levels are approximately fully charged.

35. The computer system of claim 24 further wherein:

the first battery pack includes a first battery processor, the first battery processor controlling the conductivity of the first switch;

the second battery pack includes a second battery processor, the second battery processor controlling the conductivity of the second switch;

the charge controller makes conductive the first switch by directing the first battery processor to make conductive the first switch; and the charge controller makes conductive the second switch by directing the second battery processor to make conductive the second switch.

36. The computer system of claim 24 wherein:

the first and second levels are of a range of approximately 60 percent to 90 percent of fully charged.

37. The computer system of claim 24 wherein the third and fourth levels are approximately fully charged.

* * * * *